(12) United States Patent
Murphy

(10) Patent No.: US 11,548,248 B1
(45) Date of Patent: Jan. 10, 2023

(54) POLYMER STRUCTURE REPAIR SYSTEM

(71) Applicant: Gary M. Murphy, Enon Valley, PA (US)

(72) Inventor: Gary M. Murphy, Enon Valley, PA (US)

( * ) Notice: Subject to any disclaimer, the term of this patent is extended or adjusted under 35 U.S.C. 154(b) by 93 days.

(21) Appl. No.: 17/348,749

(22) Filed: Jun. 15, 2021

(51) Int. Cl.
    *B29C 73/02*     (2006.01)

(52) U.S. Cl.
    CPC ....................... *B29C 73/02* (2013.01)

(58) Field of Classification Search
    CPC ........................................ B29C 73/02
    See application file for complete search history.

(56) References Cited

U.S. PATENT DOCUMENTS

2012/0252944 A1\* 10/2012 Araki .................. C09D 175/04
    524/110

OTHER PUBLICATIONS

Chemlock 289 Material Safety Data Sheet, Lord Corporation, Sep. 21, 2012.
Chemlock 290 Material Safety Data Sheet, Lord Corporation, Jun. 18, 2013.
Chemlock 289/290 Technical Data, Lord Corporation, 2019.

\* cited by examiner

*Primary Examiner* — Jeffry H Aftergut
*Assistant Examiner* — Jaeyun Lee
(74) *Attorney, Agent, or Firm* — William F. Lang, IV; Lang Patent Law LLC

(57) ABSTRACT

A system for repairing polymer structures, for example, polypropylene storage tanks for liquid, includes the application of a unique primer in connection with a plurality of layers of other adhesives to attach a liquid-impermeable elastomeric liner. The system permits the liquid-impermeable elastomeric liner to expand and contract along with the polymer tank, thus resisting separation of the liner from the polymer.

8 Claims, 13 Drawing Sheets

| 26 | RUBBER |
| --- | --- |
| 24 | CEMENT |
| 22 | CEMENT |
| 20 | INTERMEDIATE 290 PRIMER |
| 18 | CHEMLOCK 289 PRIMER |
| 16 | GM1 PRIMER |
| 12 | SUBSTRATE |

11

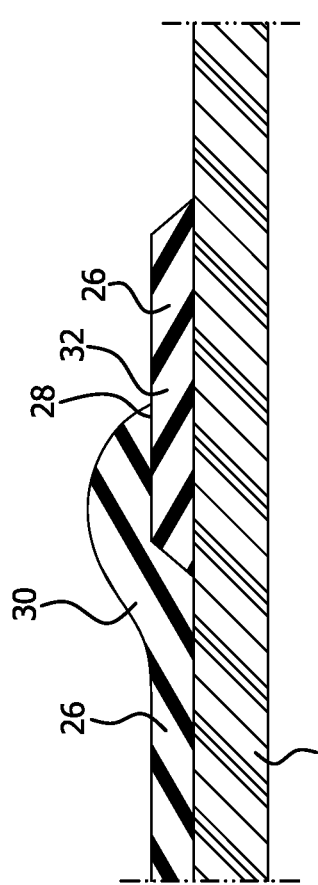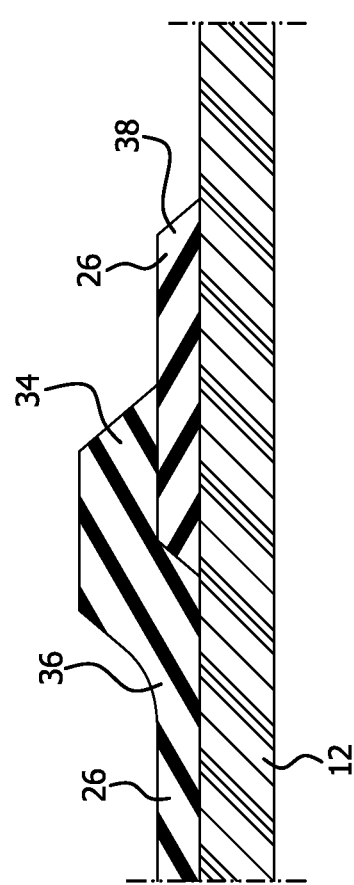

| 80 | RUBBER |
|---|---|
| 78 | CEMENT |
| 26 | RUBBER |
| 24 | CEMENT |
| 22 | CEMENT |
| 20 | INTERMEDIATE 290 PRIMER |
| 18 | CHEMLOCK 289 PRIMER |
| 16 | GM1 PRIMER |
| 12 | SUBSTRATE |

POLYMER STRUCTURE REPAIR SYSTEM

TECHNICAL FIELD

The present invention is related to repair of polymer structures. More specifically, a system and method for adhering a liner to a polymer structure while accommodating temperature-related expansion and contraction of the materials is provided.

BACKGROUND INFORMATION

Polymer, for example, polypropylene, is used for a variety of structures, for example, storage tanks for liquids. Some of these liquids may be acids, bases, or otherwise corrosive. The tank must be able to withstand not only the weight and pressure of the liquid, but also any degradation that the liquid would tend to cause to the tank.

When a polymer tank degrades, develops cracks, etc., previous attempts to repair that tank have proven to be problematic or unsuccessful. For example, if a liner is added to the tank, and if the liner has a different rate of thermal expansion than the tank, the differences in thermal expansion rates tends to cause prior repair efforts to fail. In particular, polypropylene can expand and contract about 1 inch for every 10 feet of material when heated to a temperature of about 180° F., and any repair must take this expansion and contraction into account.

Accordingly, there is a need for a system for repairing polymer tanks. There is a need for this system to accommodate any differences in the rate of thermal expansion between the polymer tank and any liner added to repair the tank.

SUMMARY

The above needs are met by a priming compound consisting essentially of between about 10% and about 30% toluene; between about 10% and about 30% acetone; between about 10% and about 30% methyl ethyl ketone; between about 10% to about 15% tetrahydrofuran; between about 10% to about 15% cyclohexanone; and between about 15% to about 25% a compound consisting essentially of about 35% xylene, about 25% methyl ethyl ketone, about 15% isopropanol, about 10% ethyl benzene, about 5% epoxy resin, about 5% epichlorohydrin, and about 1% ethyl alcohol.

The above needs are further met by a priming compound consisting essentially of: between about 10% and about 30% toluene; between about 10% and about 30% acetone; between about 13.75% and about 36.25% methyl ethyl ketone; between about 10% to about 15% tetrahydrofuran; between about 10% to about 15% cyclohexanone; between about 5.25% and about 8.75% xylene; between about 2.25% and about 3.75% isopropanol; between about 1.5% and about 2.5% ethyl benzene; between about 0.75% and about 1.25% epoxy resin; between about 0.75% and about 1.25% epichlorohydrin; and between about 0.15% and about 0.25% ethyl alcohol.

The above needs are additionally met by a method of repairing a polymer structure. The method comprises applying a first primer to a surface of the polymer structure, the primer consisting essentially of between about 10% and about 30% toluene; between about 10% and about 30% acetone; between about 10% and about 30% methyl ethyl ketone; between about 10% to about 15% tetrahydrofuran; between about 10% to about 15% cyclohexanone; and between about 15% to about 25% a compound consisting essentially of about 35% xylene, about 25% methyl ethyl ketone, about 15% isopropanol, about 10% ethyl benzene, about 5% epoxy resin, about 5% epichlorohydrin, and about 1% ethyl alcohol. The method further comprises applying a second primer to the first primer, the second primer consisting essentially of about 35% xylene, about 25% methyl ethyl ketone, about 15% isopropanol, about 10% ethyl benzene, about 5% epoxy resin, about 5% epichlorohydrin, and about 1% ethyl alcohol. The method includes applying a third primer to the second primer, the third primer consisting essentially of about 95% toluene and about 5% methyl methacrylate. The method additionally comprises applying a first cement to the third primer, applying a second cement to the first cement, and applying a liquid-impermeable elastomeric liner to the second cement.

These and other aspects of the invention will become more apparent through the following description and drawings.

BRIEF DESCRIPTION OF THE DRAWINGS

FIG. 11 is an edge cross sectional view of a closed skive joint between adjacent liner pieces.

FIG. 12 is an edge cross sectional view of an open skive joint between adjacent liner pieces.

FIG. 19 is an edge cross sectional view of the repaired structure after application of a second liner to the first liner as shown in FIG. 10.

DETAILED DESCRIPTION

Figure 1:
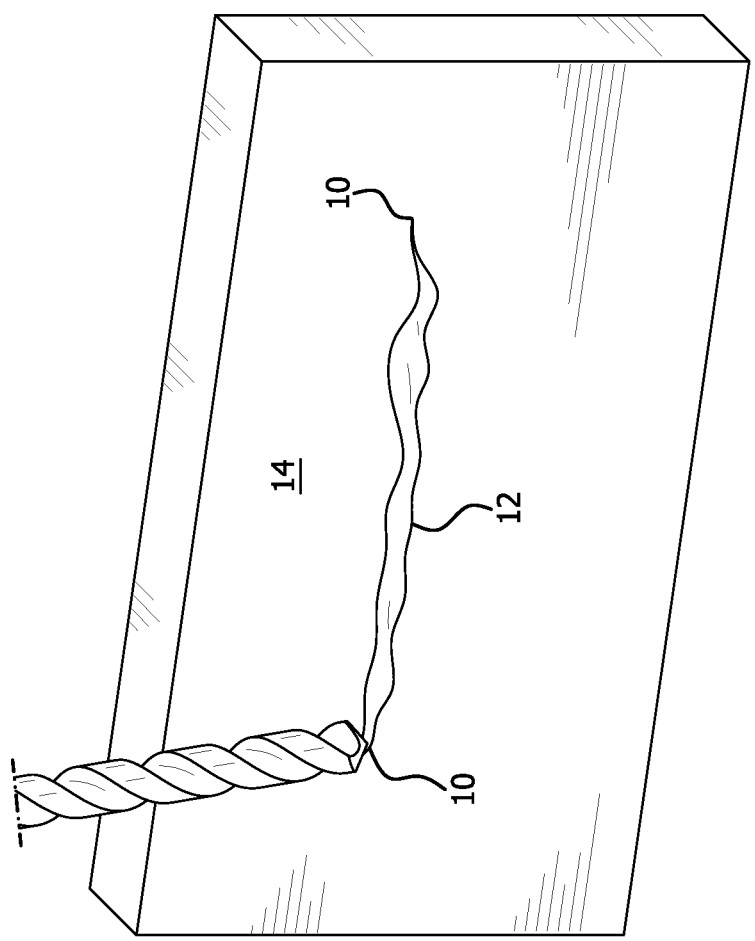
FIG. 1 is a perspective view of the step of drilling the ends of a crack to resist further enlargement of the crack.

Referring to the drawings, a system for repairing polymer structures is illustrated. The illustrated example of a polymer structure is a polypropylene tank that is utilized to store a liquid. Some examples of the liquid may be an acid, a base, or otherwise corrosive. These polypropylene storage tanks must be taken out of service and replaced if the polypropylene becomes compromised.

Figure 2:
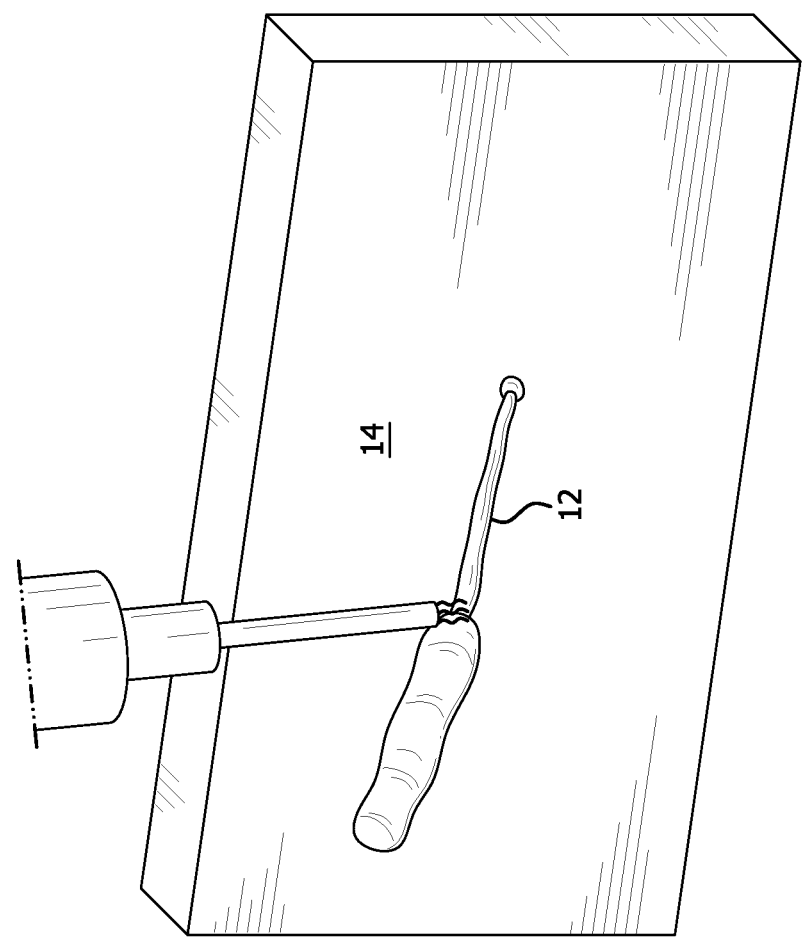
FIG. 2 is a perspective view of the step of heat welding a crack.

The illustrated example of a process of repairing a polypropylene tank or other polymer structure begins with repairing the crack. FIG. 1 illustrates drilling a hole at each end 10 of a crack 12 in a polymer substrate 14, which is a well-known procedure for interrupting further spreading of a crack 12. Next, the crack 12 can be heat welded as illustrated in FIG. 2.

Figure 3:
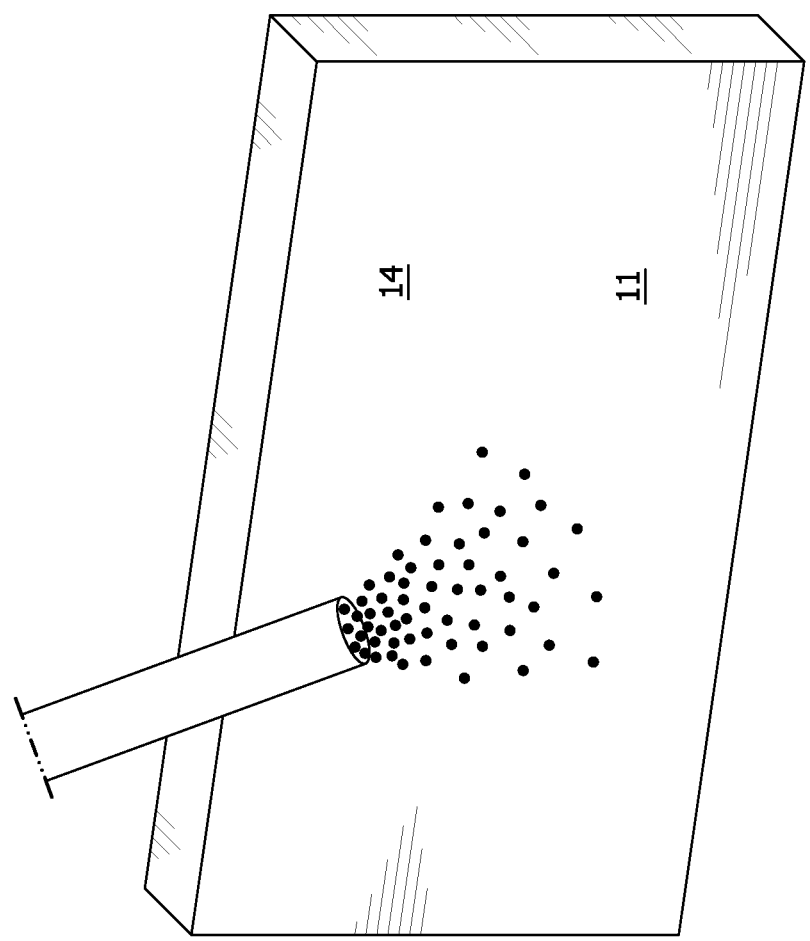
FIG. 3 is a perspective view of the step of abrasive blasting a surface to be repaired.

Regardless of whether a crack is present in a surface to be lined, the entire substrate 14 to be lined is cleaned through abrasive blasting as shown in FIG. 3. Prior to beginning abrasive cleaning, the entire surface 11 must be free of loose debris, plastic splatter, wet areas, oil, grease, or other foreign material. In some examples, the surface 11 is cleaned with a mixture of toluene, methyl ethyl ketone, tetrahydrofuran, and cyclohexanone. The surface should also be free of any pits, cracks, air pockets, or the like. In some examples, surface preparation is performed with a surface temperature of 5° F. above the dewpoint, as well as between 50° F. and 90° F., with a humidity below 85%. The air supply should be checked for water, oil, and other contaminants by a white blotter test, which is known to those skilled in the art. Some examples may utilize abrasive blasting media which is sold under the trademark BLACK BEAUTY, for example, BLACK BEAUTY-12/40 or BLACK BEAUTY 20/40, both of which are coal slag abrasives made by Harsco Materials International in Mechanicsburg, Pa. The entire surface 11 should be abrasive blasted to a profile of about 0.002 inch to about 0.005 inch. After abrasive blasting, the surface 11 is again cleaned, using a mixture of acetone, toluene, methyl ethyl ketone, tetrahydrofuran, cyclohexanone. Once abrasive blasting is complete, the surface 11 should be protected from outside contamination. Priming, as described below, should be completed within an hour of completion of blasting.

Figure 4:
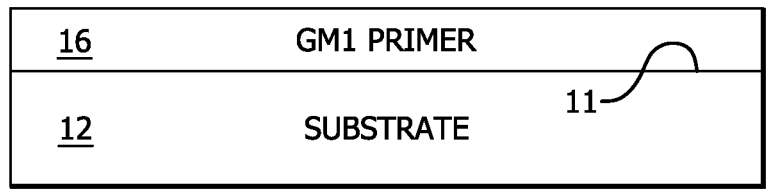
FIG. 4 is an edge cross sectional view of the application of a primer of the present invention to a surface to be repaired.

Referring to FIG. 4, the first priming layer 16 is applied to the substrate 12. The first priming layer 16, which herein is designated a GM1 primer, some examples of which are made from about 10% to about 30% toluene (Chemical Abstracts Service (CAS) registry number 108-88-3), about 10% to about 30% acetone (CAS registry number 67-64-1), about 10% to about 30% methyl ethyl ketone (CAS registry number 78-93-3), about 10% to about 15% tetrahydrofuran (CAS registry number 108-99-9), about 10% to about 15% cyclohexanone (CAS registry number 108-94-1), and about 15% to about 25% CHEMLOCK 289 primer (available from LORD Corporation in Cary, N.C.). One example is made from about 20% toluene, about 20% acetone, about 20% methyl ethyl ketone, about 10% tetrahydrofuran, about 10% cyclohexanone, and about 20% CHEMLOCK 289 primer. All of the above percentages are by volume. CHEMLOCK 289 primer is made from about 35% xylene, about 25% methyl ethyl ketone, about 15% isopropanol, about 10% ethyl benzene, about 5% epoxy resin, about 5% epichlorohydrin, and about 1% ethyl alcohol. Thus, a substantially equivalent composition may be used instead of CHEMLOCK 289 without departing from the invention. The GM1 primer is thoroughly mixed prior to application. The temperature of the substrate 12 is maintained at about 5° above the dewpoint during application of the GM1 primer. The primer should be applied in a manner that thoroughly coats the surface of the substrate 12, without runs, drips, or puddles. Once the primer is applied, is allowed to dry for at least about one hour.

Figure 5:
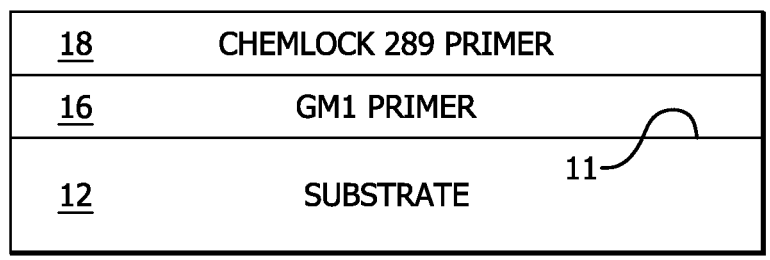
FIG. 5 is an edge cross sectional view of the application of another primer to the first primer of FIG. 4.

Referring to FIG. 5, a layer of primer 18 is applied above the GM1 primer. The layer of primer 18 in the illustrated example is made from about 35% xylene, about 25% methyl ethyl ketone, about 15% isopropanol, about 10% ethyl benzene, about 5% epoxy resin, about 5% epichlorohydrin, and about 1% ethyl alcohol, with one example being sold under the trademark CHEMLOCK 289. The CHEMLOCK 289 primer 18 is applied to a thickness of about 0.002 inch in some examples. The CHEMLOCK 289 primer 18 is allowed to dry for at least about one hour.

Figure 6:
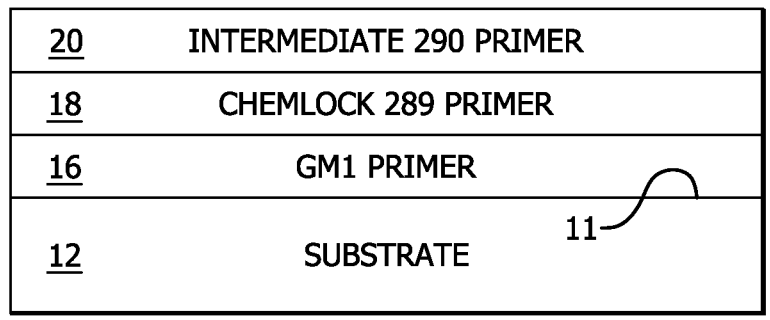
FIG. 6 is an edge cross sectional view of the application of yet another primer to the primer of FIG. 5.

Referring to FIG. 6, another layer of primer 20 is applied above the primer layer 18. One example of the primer layer 20 is made from about 95% toluene and about 5% methyl methacrylate, with one example being sold under the trademark CHEMLOCK 290 (available from LORD Corporation in Cary, N.C.) is applied above the CHEMLOCK 289 primer 18. In some examples, the CHEMLOCK 290 primer is applied to a thickness of about 0.001 inch to about 0.002 inch. The CHEMLOCK 290 primer 20 is allowed to dry for at least about one hour.

Figure 7:
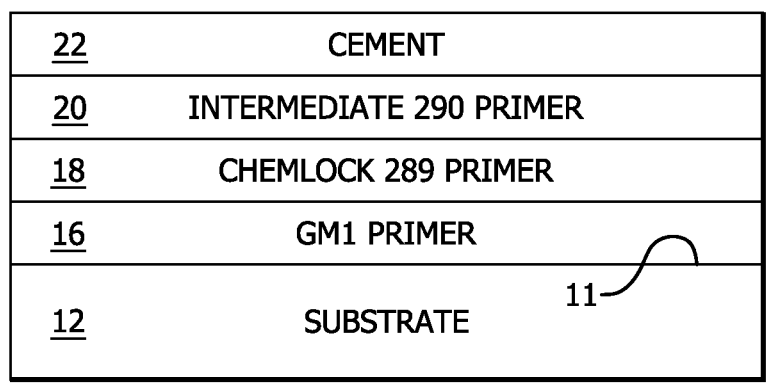
FIG. 7 is an edge cross sectional view of the application of a first cement layer to the primer of FIG. 6.
Figure 8:
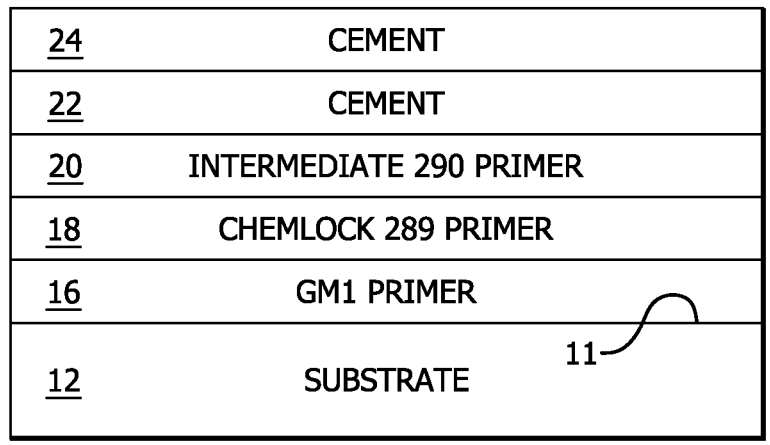
FIG. 8 is an edge cross sectional view of the application of a second layer of cement to the first layer of cement of FIG. 7.

Referring to FIG. 7, a layer of cement 22 is applied over the intermediate 290 primer 20. In some examples, the layer of cement 22 is applied to a thickness of about 0.002 inches. The type of cement used will depend on the intended contents of the tank. As one example, an adhesive which the inventor designates 629 cement, and which consists essentially of butyl isoprene, will be used for a tank intended to hold nitric acid. As another example, an adhesive that the inventor designates 324 cement, and which is made from about 65% toluene and about 35% natural isoprene, will be used for a tank that is intended to hold sulfuric acid or wastewater. Other combinations of toluene and either natural isoprene or butyl isoprene may be used for other applications, including 100% toluene, 100% butyl isoprene, or a mixture of toluene and either butyl isoprene or natural isoprene, with the amount of toluene and amount of either butyl isoprene or natural isoprene being selected depending on the specific application. The cement 22 is allowed to dry for at least about one hour. As shown in FIG. 8, a second layer of cement 24 is applied over the first layer of cement 22. In some examples, the second layer of cement 24 is also applied to a thickness of about 0.002 inch, and allowed to dry for at least about one hour.

Figure 9:
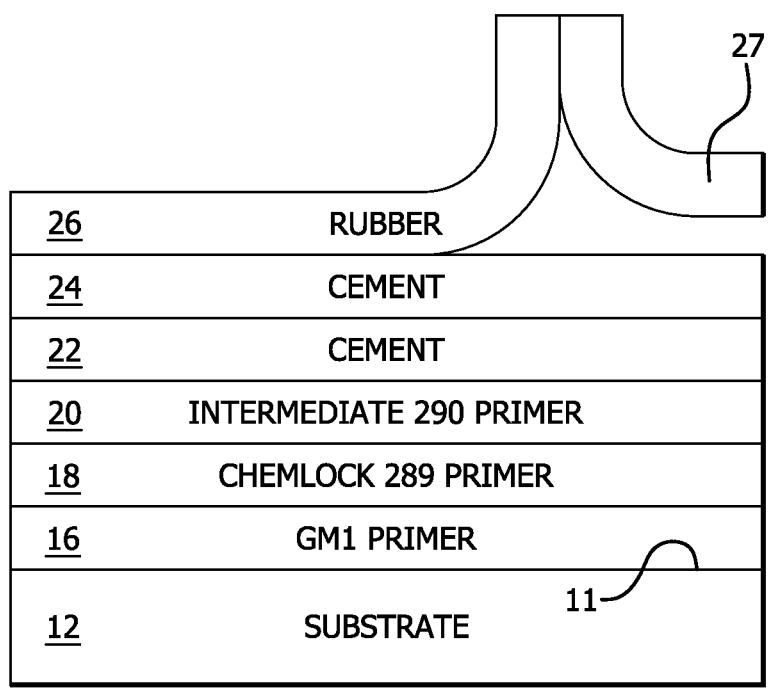
FIG. 9 is an edge cross sectional view of the application of a liner to the second layer of cement of FIG. 8.
Figure 10:
FIG. 10 is an edge cross sectional view of the repaired structure after application of a liner to the second layer of cement as shown in FIG. 9.

Referring to FIGS. 9 and 10, the liquid impermeable elastomeric liner 26 is applied over the second layer of cement 24, and is retained by the second layer of cement 24. In the illustrated example, the liner 26 is made from rubber. In order to apply the rubber, it is first unrolled and cuts the appropriate size. The rubber will typically come with a protective plastic covering one side. This is the side that will be placed against the cement layer 24. The plastic covering is removed, and then the side of the rubber 26 is covered with a lint free cloth 27. As the rubber 26 is applied to the cement 24, the cloth 27 is removed from the area between the rubber sheet 26 and cement 24. A roller is used to remove any trapped air between the rubber 26 and cement 24.

Figure 13:
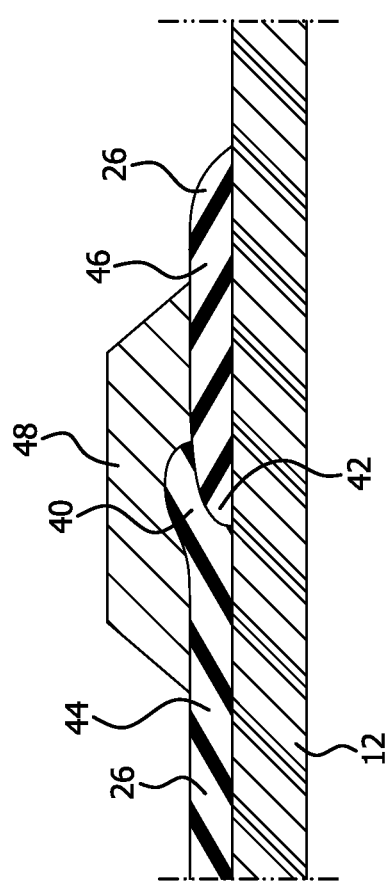
FIG. 13 is an edge cross sectional view of a butt joint with a cap for joining adjacent liner pieces.
Figure 14:
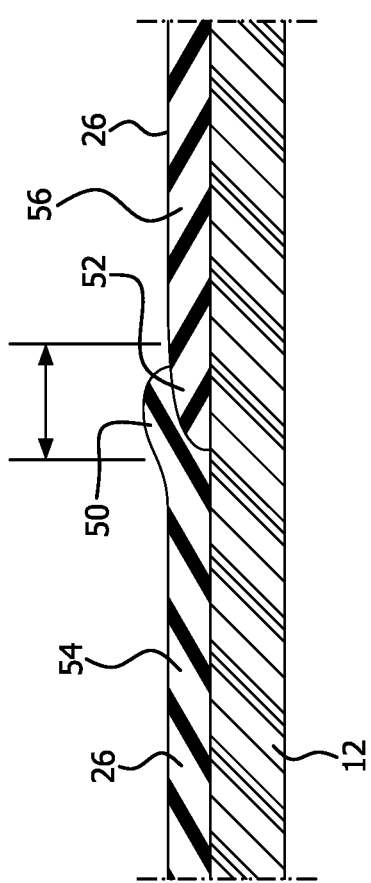
FIG. 14 is an edge cross sectional view of a butt joint for joining adjacent liner pieces.
Figure 15:
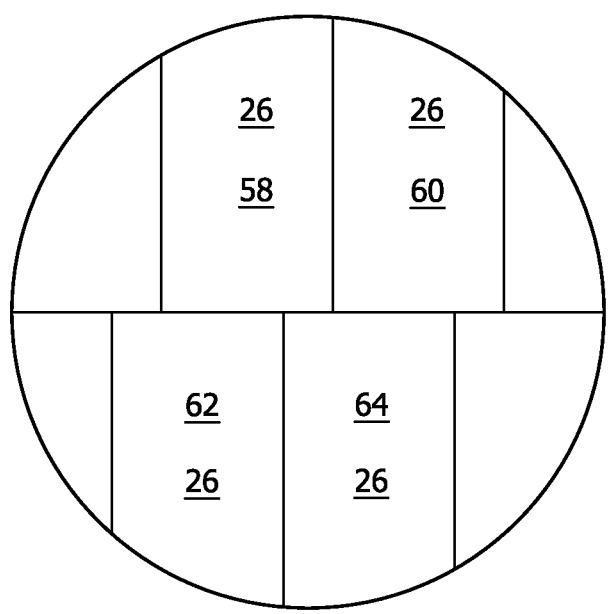
FIG. 15 is a top plan view of adjacent pieces of liner applied to a polymer surface, showing the offset edges of the liner pieces.

Referring to FIGS. 11-14 adjacent pieces of rubber 26 can be joined by one of four types of joints. In one example, closed skive as shown in FIG. 10, the cut line 28 of the individual rubber sheet 30 is hidden at its overlap of the rubber sheet 32. Another example is the open skive as shown in FIG. 11, in which the cut line 34 is visible at the overlap of the upper rubber sheet 36 and lower rubber sheet 38. In the third example, a butt joint with a cap strip as shown in FIG. 12, the ends 40,42 of the rubber sheets 44,46 are covered with a cap strip 48. In the example of or a butt joint as shown in FIG. 13, the ends 50,52 of the rubber sheets 54,56 simply abut each other with the end 50 overlapping the end 52. As shown in FIG. 15, junctures between adjacent individual rubber sheets 58,60 are offset from the individual rubber sheets 62,64. Additionally, buildup of four layers of rubber should be avoided in order to avoid droop or list of the rubber sheet.

Figure 16:
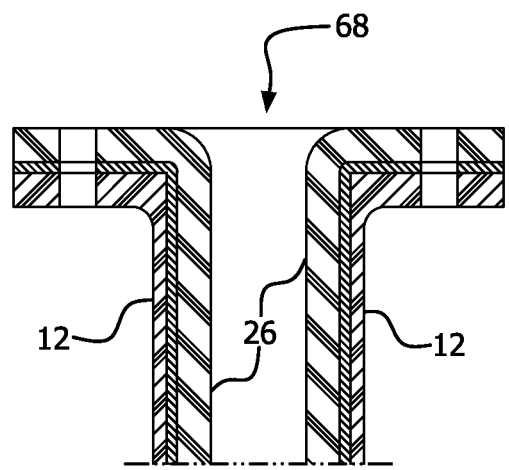
FIG. 16 is an edge cross sectional view of a liner applied to a standard outlet for a repaired polymer tank.
Figure 17:
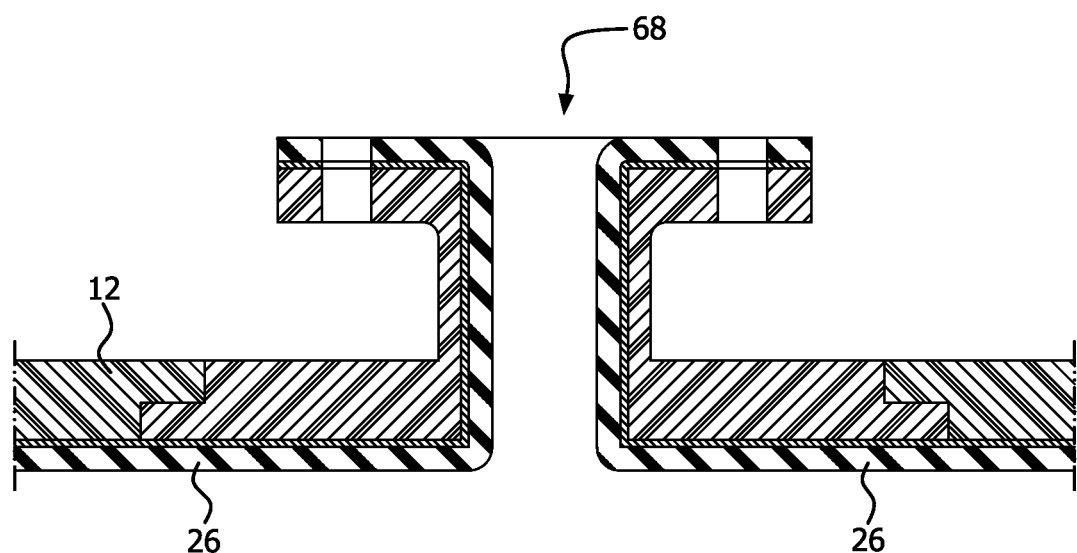
FIG. 17 is an edge cross sectional view of a liner applied to a super outlet for a repaired polymer tank.
Figure 18:
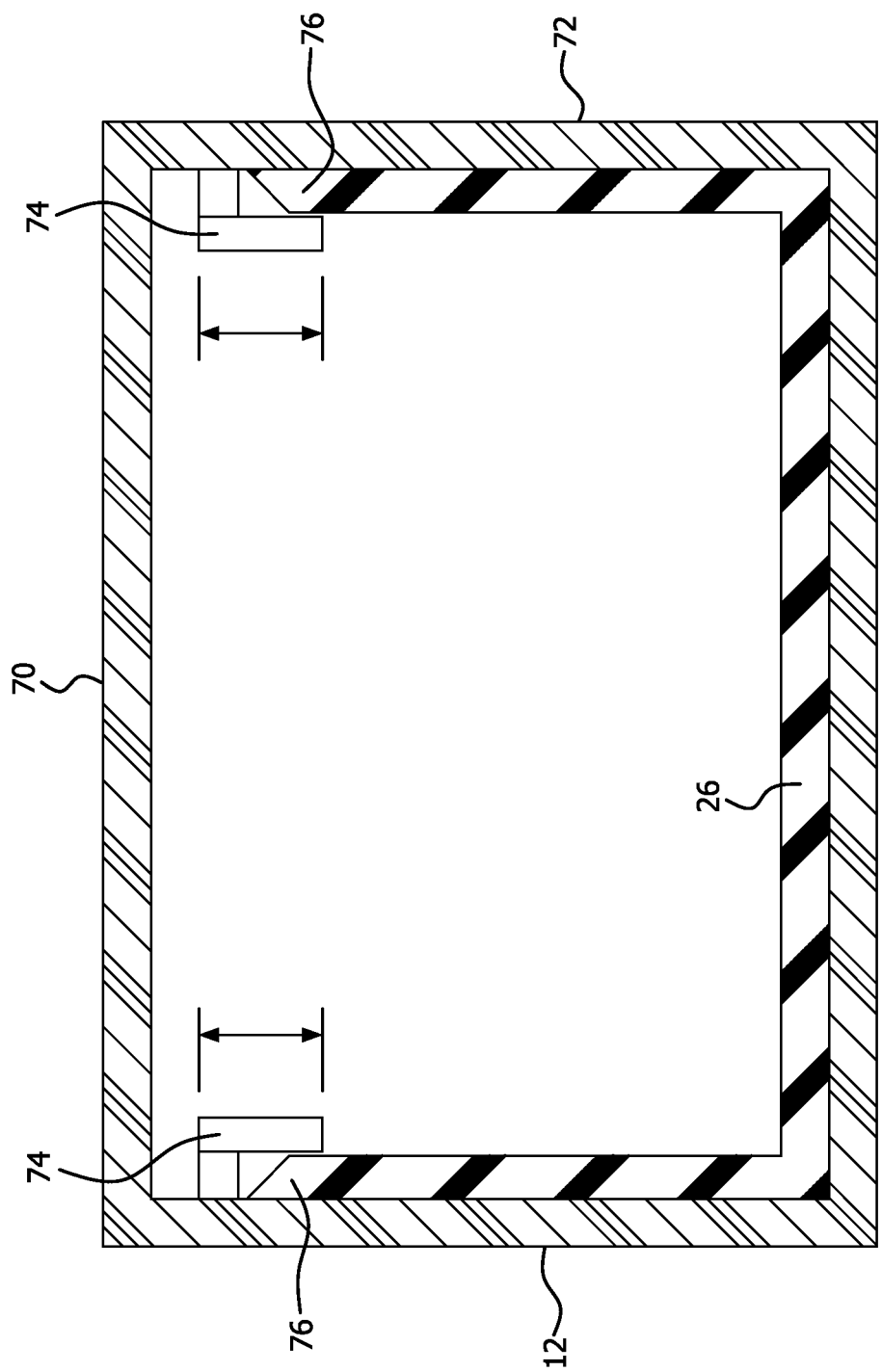
FIG. 18 is a side elevational cross sectional view of a polymer tank having a liner of the present invention, showing a cap at the ends of the liner.

FIGS. 16 and 17 illustrate the rubber lining 26 extending up through an outlet 66,68 of a polypropylene or other polymer tank. For installations that do not cover the top 70 of a tank 72, polymer caps 74 are added to the ends 76 of the rubber lining 26, as shown in FIG. 18.

FIG. 19 illustrates the application of a second elastomeric liner over the elastomeric liner 26. In the example of FIG. 19, the elastomeric liner 26 is a natural gum rubber, which will move with expansion and contraction of the substrate 12. The cement 78 is identical to the cement 22,24 as described above. The second rubber layer 80 is applied over the cement 78. Use of a natural gum rubber as the layer 26, and then adhering a second rubber layer 80 to the adhesive 78, is useful when repairing a polypropylene tank which is less than 10 years old in order to better accommodate the thermal expansion and contraction of the substrate 12.

During testing, three samples were allowed to sit in sunlight for 6 months, These samples were then subjected to pull tests of 30 lb./in.$^2$ (50 lb. total force), and all 3 samples passed the test. The samples were also subjected to heating the rubber liner to 180° F. and 200° F. for 4 hours, allowing to cool overnight, and repeating the process daily over a 14 day period. The samples again passed the pull test. This indicates that the rubber, when bonded to a polypropylene tank as described above, will expand and contract sufficiently to avoid damage to the bond from thermal expansion/contraction stresses. Conversely, a prior art system subjected to as little as 3 lb. of total force failed with three different samples. As used herein, "about" and "substantially" mean sufficiently close to the specified quantity or other item so that the overall layered adhesive structure retains the ability to resist separation of the liquid-proof elastomeric liner from the polymer under the conditions described above. Anything more than small deviation from the quantities of ingredients described herein is expected to change the essential qualities of the novel GM1 primer as well as the system for repairing polymer tanks.

The present invention therefore provides a system for repairing polymer structures, for example, polypropylene tanks, using a rubber liner and multiple adhesive layers. As part of that system, a new primer layer is provided. The system can be used to repair a tank at a cost of about $95,000, when the cost of replacing that tank would be $500,000 in addition to $100,000 to remove the old tank and install a new tank, providing a cost savings of about $505, 000.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A priming compound consisting essentially of:
 between about 10% and about 30% toluene;
 between about 10% and about 30% acetone;
 between about 10% and about 30% methyl ethyl ketone;
 between about 10% to about 15% tetrahydrofuran;
 between about 10% to about 15% cyclohexanone; and
 between about 15% to about 25% a compound consisting essentially of about 35% xylene, about 25% methyl ethyl ketone, about 15% isopropanol, about 10% ethyl benzene, about 5% epoxy resin, about 5% epichlorohydrin, and about 1% ethyl alcohol.

2. The priming compound according to claim 1, wherein the priming compound consists essentially of:
 about 20% toluene;
 about 20% acetone;
 about 20% methyl ethyl ketone;
 about 10% tetrahydrofuran;
 about 10% cyclohexanone;
 and about 20% a compound consisting essentially of about 35% xylene, about 25% methyl ethyl ketone, about 15% isopropanol, about 10% ethyl benzene, about 5% epoxy resin, about 5% epichlorohydrin, and about 1% ethyl alcohol.

3. A priming compound consisting essentially of:
 between about 10% and about 30% toluene;
 between about 10% and about 30% acetone;
 between about 13.75% and about 36.25% methyl ethyl ketone;
 between about 10% to about 15% tetrahydrofuran;
 between about 10% to about 15% cyclohexanone;
 between about 5.25% and about 8.75% xylene;
 between about 2.25% and about 3.75% isopropanol;
 between about 1.5% and about 2.5% ethyl benzene;
 between about 0.75% and about 1.25% epoxy resin;
 between about 0.75% and about 1.25% epichlorohydrin; and
 between about 0.15% and about 0.25% ethyl alcohol.

4. The priming compound of claim 3, wherein the priming compound consists essentially of:
 about 20% toluene;
 about 20% acetone;
 about 25% methyl ethyl ketone;
 about 10% tetrahydrofuran;
 about 10% cyclohexanone;
 about 7% xylene;
 about 3% isopropanol;
 about 2% ethyl benzene;
 about 1% epoxy resin;
 about 1% epichlorohydrin; and
 about 0.2% ethyl alcohol.

5. A method of repairing a polymer structure, comprising:
 applying a first primer to a surface of the polymer structure, the primer consisting essentially of:
 between about 10% and about 30% toluene;
 between about 10% and about 30% acetone;
 between about 10% and about 30% methyl ethyl ketone;
 between about 10% to about 15% tetrahydrofuran;
 between about 10% to about 15% cyclohexanone; and
 between about 15% to about 25% a compound consisting essentially of about 35% xylene, about 25% methyl ethyl ketone, about 15% isopropanol, about 10% ethyl benzene, about 5% epoxy resin, about 5% epichlorohydrin, and about 1% ethyl alcohol;

applying a second primer to the first primer, the second primer consisting essentially of about 35% xylene, about 25% methyl ethyl ketone, about 15% isopropanol, about 10% ethyl benzene, about 5% epoxy resin, about 5% epichlorohydrin, and about 1% ethyl alcohol;

applying a third primer to the second primer, the third primer consisting essentially of about 95% toluene and about 5% methyl methacrylate;

applying a first cement to the third primer;

applying a second cement to the first cement; and applying a liquid-impermeable elastomeric liner to the second cement.

6. The method according to claim 5:

further comprising abrasive blasting the surface prior to applying the first primer; and wherein the first primer is applied to the surface within about one hour of completion of abrasive blasting.

7. The method according to claim 5, wherein the cement is a either a mixture of toluene and natural isoprene, or a mixture of toluene and butyl isoprene.

8. The method according to claim 5, wherein the liquid-impermeable elastomeric liner is rubber.

\* \* \* \* \*